United States Patent
Kobayashi et al.

(10) Patent No.: US 12,234,738 B2
(45) Date of Patent: Feb. 25, 2025

(54) TURBINE WITH NOZZLE VANES

(71) Applicant: IHI Corporation, Tokyo (JP)

(72) Inventors: Takayuki Kobayashi, Tokyo (JP); Isao Morita, Tokyo (JP)

( * ) Notice: Subject to any disclaimer, the term of this patent is extended or adjusted under 35 U.S.C. 154(b) by 0 days.

(21) Appl. No.: 18/542,807

(22) Filed: Dec. 18, 2023

(65) Prior Publication Data

US 2024/0117752 A1    Apr. 11, 2024

Related U.S. Application Data

(63) Continuation of application No. PCT/JP2022/019078, filed on Apr. 27, 2022.

(30) Foreign Application Priority Data

Aug. 4, 2021    (JP) .................. 2021-128466

(51) Int. Cl.
  *F01D 17/16*    (2006.01)
  *F01D 9/02*    (2006.01)

(52) U.S. Cl.
  CPC ............ *F01D 17/16* (2013.01); *F01D 9/026* (2013.01); *F05D 2220/40* (2013.01)

(58) Field of Classification Search
  CPC ........ F01D 17/16; F01D 9/026; F01D 17/165; F05D 2220/40; F02B 37/24
  See application file for complete search history.

(56) References Cited

U.S. PATENT DOCUMENTS

| | | | |
|---|---|---|---|
| 10,227,889 B2 | 3/2019 | Arnold et al. | |
| 10,612,411 B2 * | 4/2020 | Nishioka | F02B 37/24 |

FOREIGN PATENT DOCUMENTS

| | | |
|---|---|---|
| JP | S63-061546 | 4/1988 |
| JP | H3-092503 | 9/1991 |
| JP | H8-007061 | 2/1996 |
| JP | H10-141074 | 5/1998 |
| JP | 2000-008869 | 1/2000 |
| JP | 2000-154728 | 6/2000 |
| JP | 2001-234752 | 8/2001 |
| JP | 2005-133665 | 5/2005 |
| JP | 2007-309140 | 11/2007 |
| JP | 2012-167640 | 9/2012 |
| JP | 2014-066150 | 4/2014 |
| JP | 2014-077423 | 5/2014 |

OTHER PUBLICATIONS

International Preliminary Report on Patentability with Written Opinion dated Feb. 15, 2024 for PCT/JP2022/019078.
International Search Report dated Jul. 19, 2022 for PCT/JP2022/019078.

* cited by examiner

*Primary Examiner* — J. Todd Newton
(74) *Attorney, Agent, or Firm* — SOEI PATENT & LAW FIRM (57) ABSTRACT

A turbine includes a turbine housing having a scroll flow passage and a gas inflow passage fluidly coupled to the scroll flow passage, and a variable nozzle assembly located inside the turbine housing. The variable nozzle assembly includes a plurality of nozzle vanes located in the gas inflow passage and a plurality of vane shafts separately fixed to the nozzle vanes. The plurality of nozzle vanes includes a first nozzle vane and a number of second nozzle vanes. A width of the first nozzle vane in an axial direction of the vane shafts is smaller than a width of each of the second nozzle vane in the axial direction of the vane shafts.

20 Claims, 9 Drawing Sheets

TURBINE WITH NOZZLE VANES

CROSS-REFERENCE TO RELATED APPLICATIONS

This application is a continuation application of PCT Application No. PCT/JP2022/019078, filed on Apr. 27, 2022, which claims the benefit of priority from Japanese Patent Application No. 2021-128466, filed on Aug. 4, 2021. The entire contents of the above listed PCT and priority applications are incorporated herein by reference.

BACKGROUND

Field

The present disclosure relates to a turbine and a turbocharger.

Description of the Related Art

Japanese Unexamined Patent Application Publication No. H10-141074, No. 2007-309140 and No. 2007-309140 disclose turbochargers. They are variable displacement turbochargers and have a plurality of nozzle vanes for controlling the inflow of exhaust gas to a turbine wheel. For example, the nozzle vanes are arranged at regular intervals around the turbine wheel in a gas inflow passage connecting a scroll flow passage and the turbine wheel. The nozzle vanes rotate, in synchronization with each other, in the gas inflow passage, whereby the cross-sectional area of the flow passage changes and the flow rate of the exhaust gas is controlled. The adjustment to the flow rate of the exhaust gas adjusts the rotational speeds of the turbine wheel and a compressor wheel, and the pressure of compressed air to be delivered to an internal combustion engine is appropriately controlled.

SUMMARY

Disclosed herein is an example turbine that include a turbine housing having a scroll flow passage and a tongue portion of the scroll flow passage, and a variable nozzle unit provided inside the turbine housing and having a plurality of nozzle vanes disposed in a gas inflow passage into which gas flows from the scroll flow passage. Among the nozzle vanes, at least the nozzle vane disposed at a position closest to the tongue portion may be an auxiliary vane different from the other nozzle vanes, and a width of the auxiliary vane in a rotating shaft direction may be smaller than widths of the other nozzle vanes.

DETAILED DESCRIPTION

Example turbines are disclosed herein. The turbine may include a turbine housing having a scroll flow passage and a tongue portion of the scroll flow passage, and a variable nozzle unit provided inside the turbine housing and having a plurality of nozzle vanes disposed in a gas inflow passage into which gas flows from the scroll flow passage. Among the nozzle vanes, at least the nozzle vane disposed at a position closest to the tongue portion may be an auxiliary vane different from the other nozzle vanes, and a width of the auxiliary vane in a rotating shaft direction is smaller than widths of the other nozzle vanes.

In some examples, the rotating shaft of the auxiliary vane may be greater than rotating shafts of the other nozzle vanes.

In some examples, the auxiliary vane is configured to be non-rotatable at a fully closed position of a nozzle in the variable nozzle unit.

In some examples, the auxiliary vane may be located in the gas inflow passage closer to a fluid discharge direction of a turbine wheel.

In some examples, the turbine may include an urging mechanism configured to urge the auxiliary vane toward the fluid discharge direction.

In some examples, the turbine may include a plurality of scroll flow passages.

Additionally, an example turbine may include a turbine housing having a scroll flow passage and a tongue portion of the scroll flow passage, a turbine wheel housed in the turbine housing, a gas inflow passage configured to connect the scroll flow passage and the turbine wheel, and a plurality of nozzle vanes disposed, in the gas inflow passage, on a circumference centered on a rotation axis of the turbine wheel. Among the plurality of nozzle vanes, at least the nozzle vane adjacent to the tongue portion may have a width in a rotating shaft direction smaller than widths in a rotating shaft direction of the other nozzle vanes different in shape from the nozzle vane adjacent to the tongue portion. The rotating shaft of the nozzle vane adjacent to the tongue portion may be greater than the rotating shafts of the other nozzle vanes.

In some example, the turbine may include a first scroll flow passage and a second scroll flow passage provided at a position of a rotation target centered on the rotation axis. The first scroll flow passage may have a first tongue portion, the second scroll flow passage may have the second tongue portion. A width of a nozzle vane adjacent to the first tongue portion in a rotating shaft direction and a width of a nozzle vane adjacent to the second tongue portion in a rotating shaft direction may be smaller than the widths of the other nozzle vanes in the rotating shaft direction.

Example turbochargers that include example turbines are also disclosed herein.

In the following description, with reference to the drawings, the same reference numbers are assigned to the same components or to similar components having the same function, and overlapping description is omitted.

Figure 1:
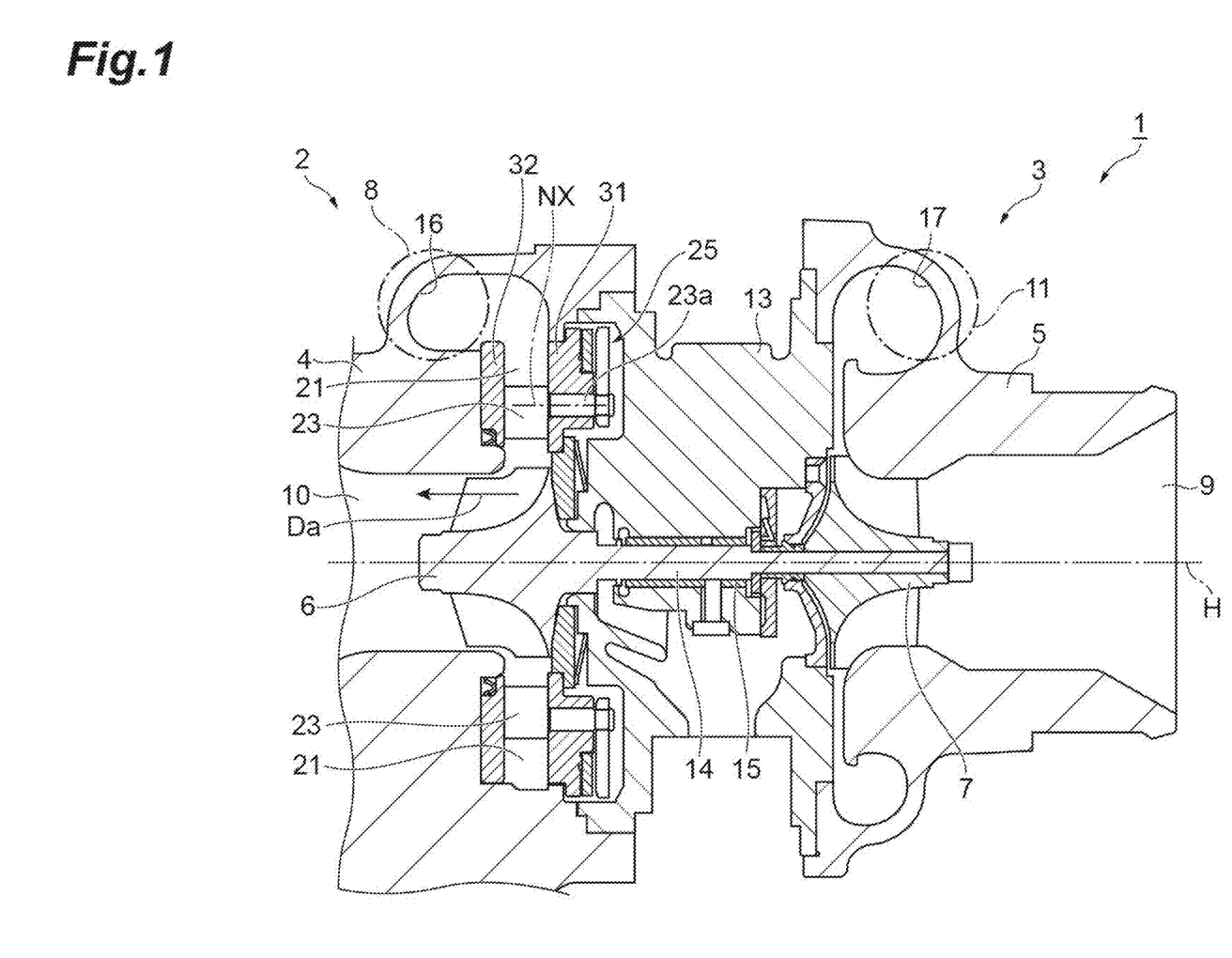
FIG. 1 is a cross-sectional view illustrating an example turbocharger.

FIG. 1 illustrates an example variable displacement turbocharger 1. The variable displacement turbocharger 1 is applied to, for example, an internal combustion engine of a ship or a vehicle. The variable displacement turbocharger 1 includes a turbine 2 and a compressor 3. The turbine 2 includes a turbine housing 4 and a turbine wheel 6 housed in the turbine housing 4. The turbine housing 4 has a scroll flow passage 16 extending circumferentially around the turbine wheel 6. The compressor 3 includes a compressor housing 5 and a compressor wheel 7 housed in the compressor housing 5. The compressor housing 5 has a scroll flow passage 17 extending circumferentially around the compressor wheel 7.

The turbine wheel 6 is provided at one end of a rotary shaft 14, and the compressor wheel 7 is provided at the other end of the rotary shaft 14. A bearing housing 13 is provided between the turbine housing 4 and the compressor housing 5. The rotary shaft 14 is rotatably supported by the bearing housing 13 through a bearing 15, and the rotary shaft 14, the turbine wheel 6, and the compressor wheel 7 rotate about a rotation axis H as a single rotator.

The turbine housing 4 is provided with an exhaust gas inlet 8 and an exhaust gas outlet 10. Exhaust gas discharged from an internal combustion engine flows into the turbine housing 4 through the exhaust gas inlet 8, and flows to the turbine wheel 6 through the scroll flow passage 16 to thereby rotate the turbine wheel 6. Thereafter, the exhaust gas flows out of the turbine housing 4 through the exhaust gas outlet 10.

The compressor housing 5 is provided with a suction port 9 and a discharge port 11. When the turbine wheel 6 rotates as described above, the compressor wheel 7 rotates through the rotary shaft 14. The rotating compressor wheel 7 draws in external air through the suction port 9. This air passes through the compressor wheel 7 and the scroll flow passage 17, is compressed, and the resultant is discharged from the discharge port 11. The compressed air discharged from the discharge port 11 is supplied to the internal combustion engine.

In the following description, when "axial direction", "radial direction", "circumferential direction", and the like are mentioned, they may be understood to mean the direction of the rotation axis H, the radial direction of rotation, and the circumferential direction of rotation of the turbine wheel 6, respectively. In addition, "upstream", "downstream", and the like may be understood to mean upstream and downstream of the exhaust gas in the turbine 2. In addition, in the direction of the rotation axis H, a side close to the turbine 2 (left side in FIGS. 1 and 2) may alternatively be referred to as a "turbine side", and a side close to the compressor 3 (right side in FIGS. 1 and 2) may alternatively be referred to as a "compressor side".

Exhaust gas from the scroll flow passage 16 flows to the turbine wheel 6 of the turbine 2 in a direction orthogonal to the rotation axis H through the gas inflow passage 21. The exhaust gas is then discharged from the turbine wheel 6 toward the exhaust gas outlet 10 in the direction of the rotation axis H. A movable nozzle vane 23 is provided in the gas inflow passage 21 connecting the scroll flow passage 16 and the turbine wheel 6. A plurality of nozzle vanes 23 is disposed on the circumference centered on the rotation axis H, and each nozzle vane 23 rotates about an axis NX parallel to the rotation axis H. The nozzle vanes 23 rotate as described above, so that the cross-sectional area of the gas flow passage is selectively controlled according to the flow rate of the exhaust gas introduced into the turbine 2. As a drive mechanism for rotating the nozzle vanes 23 as described above, the turbine 2 includes a variable nozzle unit (e.g., a variable nozzle assembly 25). The variable nozzle assembly 25 is fitted into the turbine housing 4, and is sandwiched and fixed between the turbine housing 4 and the bearing housing 13.

Figure 2:
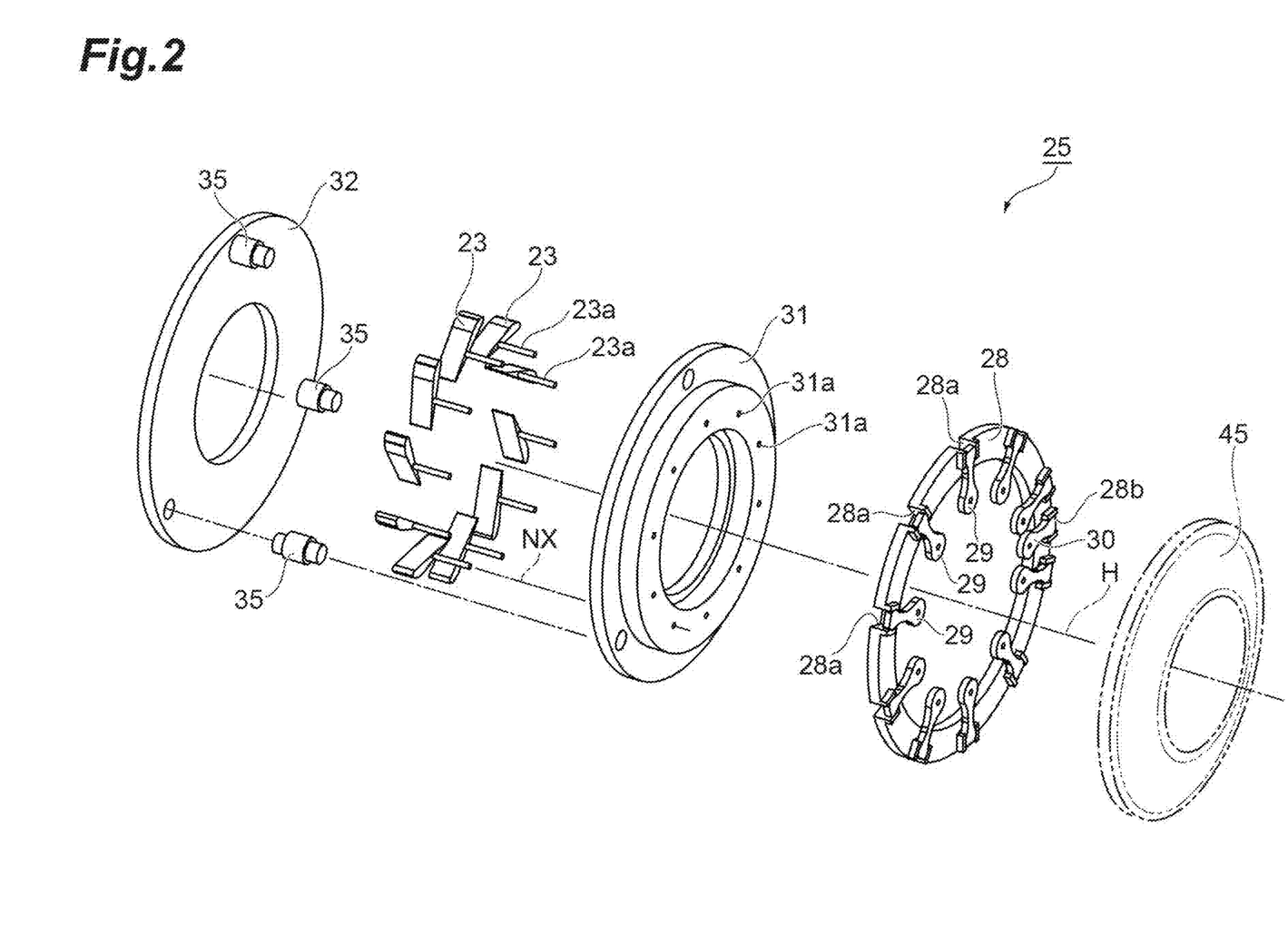
FIG. 2 is an exploded perspective view of an example variable nozzle unit.

The variable nozzle assembly 25 is illustrated in FIGS. 1 and 2. The variable nozzle assembly 25 includes the plurality of (e.g., 10 in the example illustrated in the figure) nozzle vanes 23. The variable nozzle assembly 25 further includes a nozzle ring 31 and a plate (e.g., clearance control plate) 32. The nozzle ring 31 and the clearance control plate 32 axially sandwich the nozzle vanes 23 therebetween. The clearance control plate 32 is referred to as "CC plate 32" hereinafter. The nozzle ring 31 and the CC plate 32 each have a ring shape centered on the rotation axis H, and are disposed so as to surround the turbine wheel 6 in the circumferential direction. A region sandwiched between the nozzle ring 31 and the CC plate 32 constitutes the gas inflow passage 21. The nozzle ring 31 and the CC plate 32 are coupled through a plurality of (three in the example illustrated in the drawing) connecting pins 35. The dimensions of the connecting pins 35 are made with high accuracy, which increases the dimensional accuracy of the gas inflow passage 21 in the axial direction.

A rotating shaft 23a is fixed to each nozzle vane 23. The rotating shaft 23a is rotatably inserted through a bearing hole 31a of the nozzle ring 31 and the nozzle ring 31 axially supports each nozzle vane 23 in a cantilevered manner. Although the nozzle vanes 23 are arranged at regular intervals on the circumference in the example illustrated in FIGS. 1 and 2, in other examples the nozzle vanes may be arranged at irregular or non-uniform intervals.

A drive ring 28 is provided on the compressor side of the nozzle ring 31, and the drive ring 28 is rotatably supported around the rotation axis H by a ring support portion. The drive ring 28 is a member that transmits driving force input from the outside to the nozzle vanes 23, and the drive ring 28 is formed of, for example, a metal material as a single member. The drive ring 28 has a ring shape extending on the circumference centered on the rotation axis H, and rotates about the rotation axis H upon receiving driving force from the outside.

The levers 29 are attached to the rotating shafts 23a of the nozzle vanes 23, and are arranged inside the drive ring 28 at regular intervals on the circumference. The drive ring 28 has grooves 28a formed, at regular intervals, at positions corresponding to the respective levers 29. The outer ends of the levers 29 engage with the grooves 28a of the drive ring 28. The rotating shafts 23a of the nozzle vanes 23 pass through the bearing holes 31a and are fixed to the inner ends of the levers 29. In addition, the drive ring 28 has one input groove 28b, aside from the grooves 28a. An outer end of the input lever 30 engages with the input groove 28b, and an inner end of the input lever 30 is connected to a drive mechanism.

When the driving force from the outside of the turbine 2 is input to the input lever 30 through the drive mechanism, the input lever 30 rotates about an axis parallel to the rotation axis H. Then, the outer end of the input lever 30 pushes the input groove 28b in the circumferential direction, and the drive ring 28 rotates about the rotation axis H. With the rotation of the drive ring 28, the levers 29 engaging with the grooves 28a rotate about the axis NX, and the nozzle vanes 23 rotate, in synchronization with each other, in the gas inflow passage 21 through the rotating shafts 23a.

Figure 3:
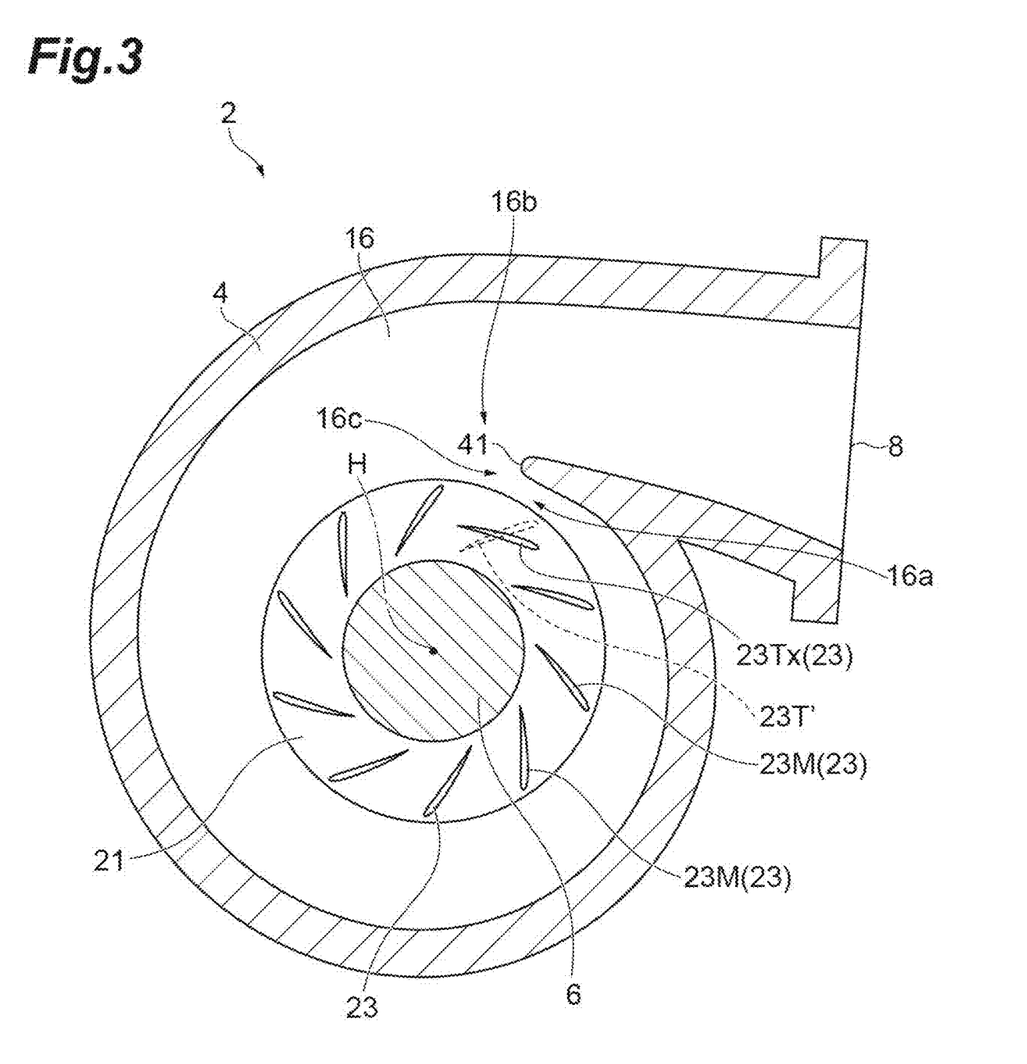
FIG. 3 is a cross-sectional view of an example turbine viewed axially.

FIG. 3 is a cross-sectional view of the turbine 2 viewed axially. As illustrated in FIG. 3, a tongue portion 41 of the scroll flow passage 16 is formed in the turbine housing 4. The scroll flow passage 16 includes a first end section 16a, a second end section 16b and a connecting section 16c fluidly coupling the first end section 16a and the second end section (16b). The tongue portion 41 is located on the connecting section 16c.

The tongue portion 41 is a portion that radially separates the winding start and the winding end of the scroll flow passage 16 wound in a spiral shape. In the gas inflow passage 21, the nozzle vanes 23 are provided at regular intervals around the turbine wheel 6.

In the turbine 2, fluid force acts on each nozzle vane 23 due to a fluid flow field in the gas inflow passage 21. Among the nozzle vanes 23, the fluid force acting on the nozzle vanes 23 in the vicinity of the tongue portion 41 may be particularly large. In a state where the nozzles of the variable nozzle unit 25 are fully open, the nozzle vanes 23 in the vicinity of the tongue portion 41 are susceptible to the pressure difference in the circumferential direction, and receive force due to the pressure difference.

The nozzle vanes 23 include a first nozzle vane 23 (e.g., auxiliary nozzle vane) and second nozzle vanes 23 (e.g., main nozzle vanes). The first nozzle vane 23 is located closest to the tongue portion 41. A distance from the first nozzle vane 23 to the tongue portion 41 is less than a distance from each of the second nozzle vanes 23 to the tongue portion 41. Hereinafter, the first nozzle vane 23 may be referred to as a "nearest vane", and is denoted by a reference sign "23T" (FIG. 4), or "23Tx" (FIG. 3). The second nozzle vane 23 may be referred to as a "main vane" and may be denoted by a reference sign "23M." The "closest to the tongue portion 41" may be understood to mean that the distance between the tip of the tongue portion 41 and the rotation axis NX of the nozzle vane 23 is shortest. The nozzle vane 23T may be a nozzle vane adjacent to the tongue portion 41. To facilitate a description of the drawings, a detailed structure of the nearest vane 23T, 23Tx is not illustrated in FIGS. 1 to 3. The nearest vane 23T, 23Tx may have a shape different from the main vanes 23M. Further, each of the main vanes 23M may have the same structure.

The nearest vane may include at least one of the following modes 1 to 4. For example, the nearest vane 23T illustrated in FIG. 4 has the modes 1, 2, and 4. The nearest vane 23Tx illustrated in FIG. 3 has the mode 3.

Figure 4:
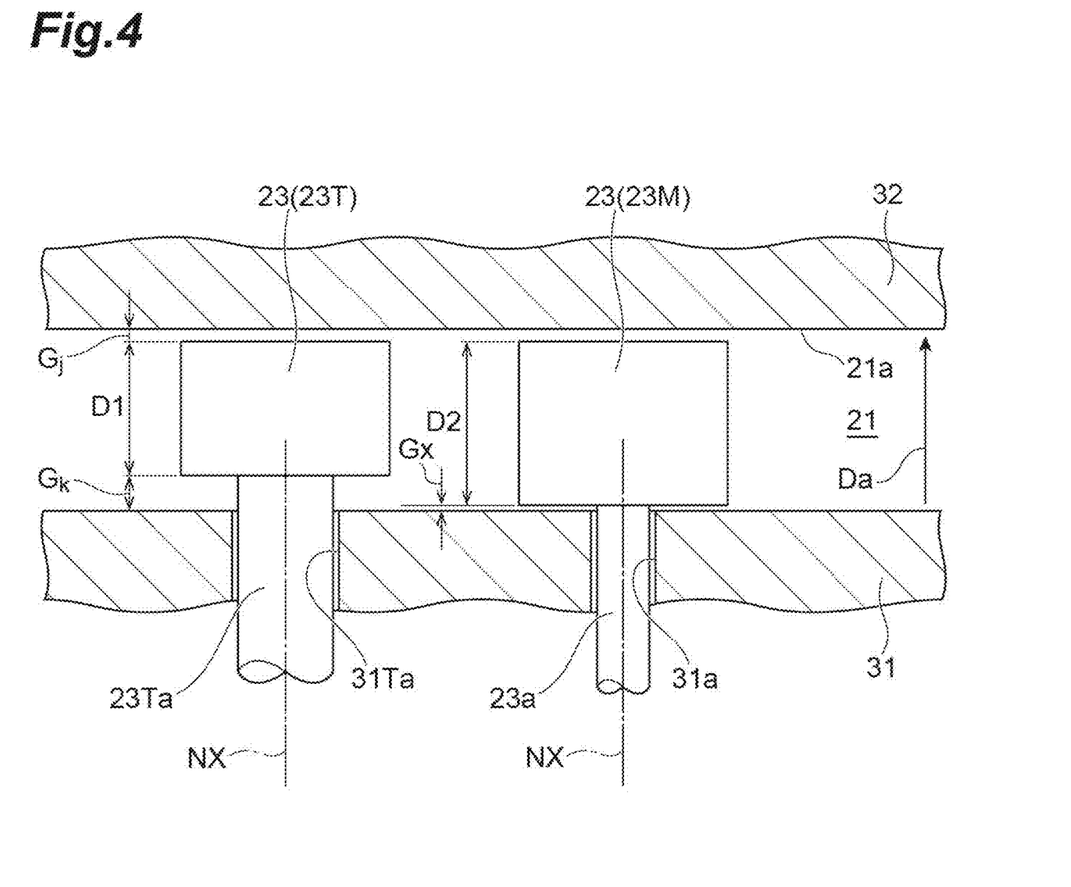
FIG. 4 is a cross-sectional view illustrating an example auxiliary vane and another nozzle vane.

MODE 1: As illustrated in FIG. 4, a width DI of the nearest vane 23T in the direction of the axis NX (e.g., a discharge direction) is narrower than a width D2 of the main vane 23M in the direction of the axis NX.

MODE 2: As illustrated in FIG. 4, a rotating shaft 23Ta of the nearest vane 23T is greater (larger in diameter) than the rotating shaft 23a of the main vane 23M. Due to the difference in diameter between the rotating shafts 23Ta and 23a, a bearing hole 31Ta into which the rotating shaft 23Ta of the nearest vane 23T is inserted is formed to have a diameter larger than that of the bearing hole 31a into which the rotating shaft 23a of the main vane 23M is inserted.

MODE 3: As illustrated in FIG. 3, the nearest vane is configured to be a non-rotatable vane 23Tx at a fully closed position of the nozzle in the variable nozzle assembly 25. Note that 23T' indicated by a broken line in FIG. 3 indicates a fully open position of the nozzle in the variable nozzle assembly 25. In mode 3, for example, the rotating shaft 23Ta may be non-rotatably joined to the inner peripheral surface of the bearing hole 31Ta.

Figure 5:
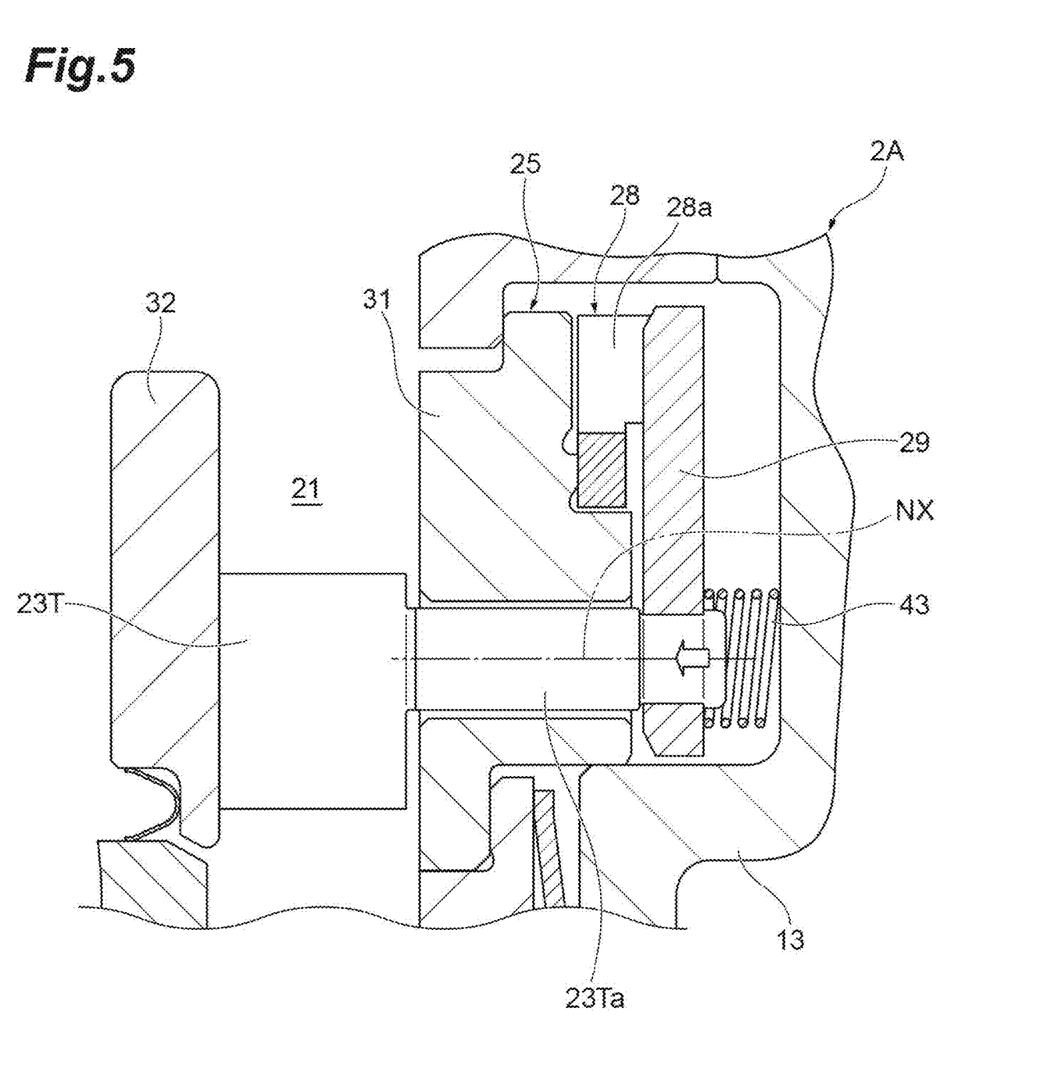
FIG. 5 is an enlarged cross-sectional view illustrating part of an example variable nozzle unit.
Figure 6:
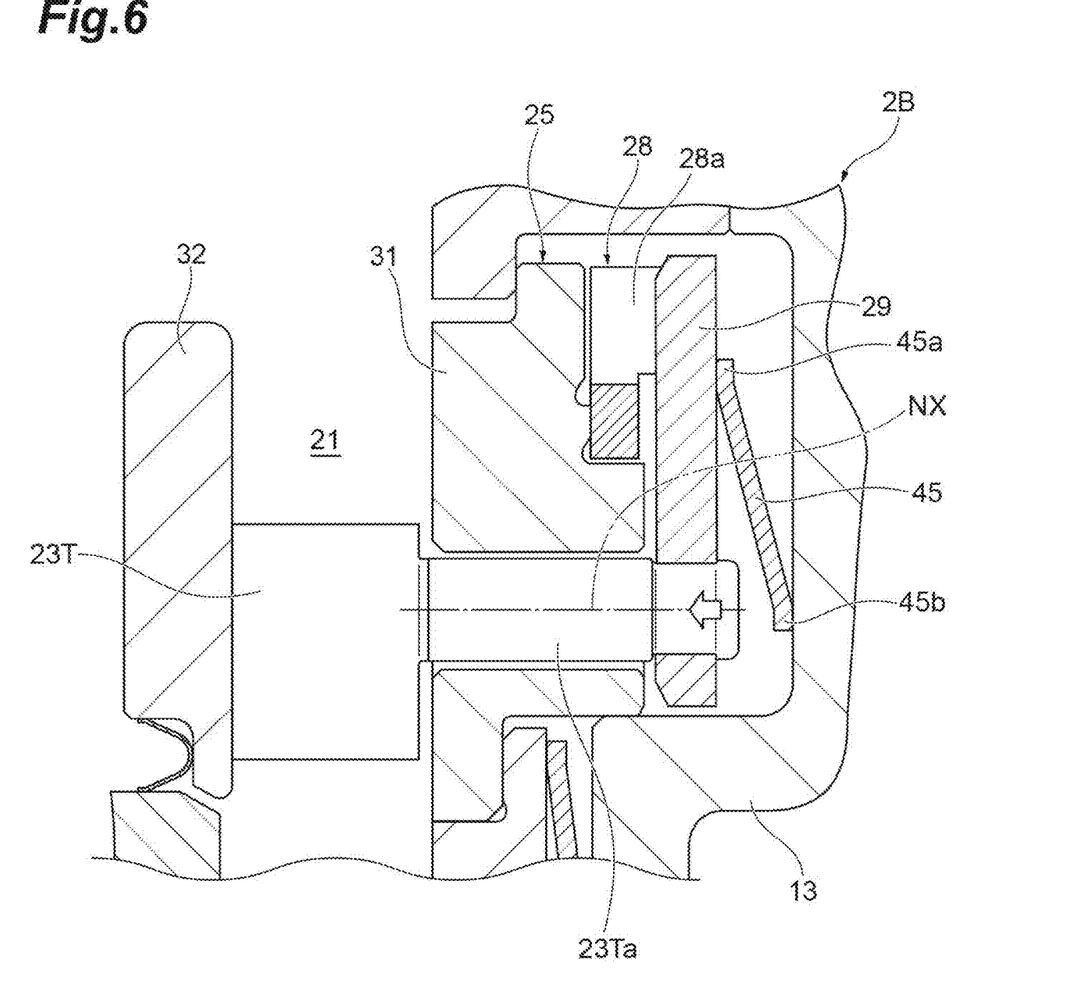
FIG. 6 is an enlarged cross-sectional view illustrating part of an example variable nozzle unit.

MODE 4: As illustrated in FIG. 4 with reference to FIG. 1, the nearest vane 23T is positioned in the gas inflow passage 21 closer to the exhaust gas discharge direction Da of the turbine wheel 6 (direction from the turbine wheel 6 toward the exhaust gas outlet 10). The nearest vane 23T may be positioned closer to a shroud surface 21a in the gas inflow passage 21. The nearest vane 23T is configured to be displaced, in a parallel direction to the discharge direction Da, from a center position of the gas inflow passage 21. Accordingly, a gap Gk between the nearest vane 23T and the nozzle ring 31 is larger than a gap Gj between the nearest vane 23T and the CC plate 32. The nearest vane 23T may abut against the shroud surface 21a and the gap Gj may be 0 (zero). In mode 4, the turbine 2 has an urging mechanism that urges the nearest vane 23T toward the shroud surface 21a. An example structure of the urging mechanism is illustrated in FIGS. 5 and 6. Although the urging mechanism is described with reference to a coil spring 43 and a disc spring 45 in some examples, it may include other types of elastic structures, such as a leaf spring and a compression spring.

In an example turbine 2A illustrated in FIG. 5, an end on the compressor side of the rotating shaft 23Ta of the nearest vane 23T is joined to the inner end of the lever 29 by caulking or the like. The coil spring 43 is compressed and sandwiched between the variable nozzle assembly 25 and the bearing housing 13 at the position where the rotating shaft 23Ta and the lever 29 are joined to each other. The coil spring 43 is provided coaxially with the rotating shaft 23Ta and urges the joint part of the rotating shaft 23Ta and the lever 29 toward the turbine side. As a result, the lever 29 and the nearest vane 23T are pushed toward the turbine side, which enables the nearest vane 23T to be located closer to the CC plate 32 in the gas inflow passage 21.

"The nearest vane 23T is located closer to the CC plate 32 in the gas inflow passage 21" may be understood to mean that the gap between the nearest vane 23T and the CC plate 32 is narrower than the gap Gk between the nearest vane 23T and the nozzle ring 31. The coil spring 43 may be provided not only to the nearest vane 23T but also to all the other nozzle vanes 23. In this case, all the nozzle vanes 23 including the nearest vane 23T are located closer to the CC plate 32 in the gas inflow passage 21.

In an example turbine 2B illustrated in FIG. 6, the disc spring 45 may be provided instead of the coil spring 43. As indicated by a chain double-dashed line in FIG. 2, the disk spring 45 has a substantially conical shape with the rotation axis H as the conical axis, and the disk spring 45 is compressed and sandwiched between the variable nozzle assembly 25 and the bearing housing 13. One end 45a of the disc spring 45 in the conical axis direction is in contact with the lever 29, the other end 45b is in contact with the bearing housing 13, and the disc spring 45 urges the lever 29 toward the turbine side. As a result, the lever 29 and the nearest vane 23T are pushed toward the turbine side, which enables the nearest vane 23T to be located closer to the CC plate 32 in the gas inflow passage 21. In the example illustrated at FIG. 6, all the levers 29 of the variable nozzle assembly 25 are urged toward the turbine side by the disc springs 45. Accordingly, not only the nearest vane 23T but also all the other nozzle vanes 23 are located closer to the CC plate 32 in the gas inflow passage 21.

In the turbine 2 illustrated in FIG. 3 or FIG. 4, the fluid force on the nozzle vanes 23 may tend to be relatively strong in the vicinity of the tongue portion 41, and the fluid force acts particularly strongly on the nearest vane 23Tx or 23T.

According to the foregoing mode 1, as illustrated in FIG. 4, the width D1 of the nearest vane 23T in the axial direction is smaller than the width D2 of the main vane 23M in the axial direction (D1<D2). In addition, the nearest vane 23T is located in the gas inflow passage 21 with a large gap (Gj+Gk) in the axial direction as compared with the main vane 23M. Therefore, the fluid force acting on the nearest vane 23T due to the flow field of the gas is reduced because the area of the vane is small and some of the exhaust gas leaks through the gaps Gj and Gk. Therefore, abrasion, non-smooth movements, galling, and the like occurring in the nearest vane 23T can be reduced, leading to the achievement of the reliability of the nearest vane 23T.

According to the foregoing mode 2, as illustrated in FIG. 4, the nearest vane 23T has the rotating shaft 23Ta having a diameter larger than that of the main vane 23M. As a result, the nearest vane 23T has rigidity higher than the main vane 23M, and rattling or the like of the nearest vane 23T in the flow field of the exhaust gas can be minimized. Therefore, the degree of abrasion, non-smooth movements, galling, and the like occurring in the nearest vane 23T can be reduced, leading to the achievement of the reliability of the nearest vane 23T.

According to the foregoing mode 3, the nearest vane 23Tx is configured to be non-rotatable at a fully closed position of the nozzle in the variable nozzle assembly 25. If the nearest vane is a nearest vane 23T' located at a fully open position as indicated by a broken line in FIG. 3, high-pressure exhaust gas flowing in from the exhaust gas inlet 8 is present on the left side of the nearest vane 23T', and low-pressure exhaust gas reaching the vicinity of the tongue portion 41 after going around the scroll flow passage 16 is present on the right side of the nearest vane 23T'. Then, relatively strong fluid force due to the pressure difference between the left side and the right side of the nearest vane 23T' acts on the nearest vane 23T'. On the other hand, in the turbine 2, since the nearest vane 23Tx is fixed at the fully closed position, the exhaust gas easily flows in the circumferential direction beyond the position of the nearest vane 23Tx. Accordingly, the strong fluid force as described above may be reduced, restricted or prohibited from acting on the nearest vane 23Tx. Therefore, abrasion, non-smooth movements, galling, and the like occurring in the nearest vane 23Tx can be reduced, leading to the achievement of the reliability of the nearest vane 23Tx.

Further, in a case where the width D1 of the nearest vane 23T is reduced as described in the foregoing mode 1, the leakage flow from the nearest vane 23T in the gas inflow passage 21 increases and the turbulence of the gas flow increases. For example, the turbulence of the flow on the shroud surface 21a side may greatly affect the performance of the turbine 2. To improve performance, the leakage flow from the nozzle vanes may be reduced on the shroud surface 21a side. According to the foregoing mode 4, since the nearest vane 23T is positioned closer to the shroud surface 21a side in the gas inflow passage 21, the leakage flow from the nearest vane 23T on the shroud surface 21a side can be reduced. As a result, deterioration of the performance of the turbine 2 due to the leakage flow from the nearest vane 23T caused by the mode 1 can be prevented.

The nearest vane 23T may include all of the modes 1 to 4, or may include any one, two or three of the modes 1 to 4. The structure of the auxiliary nozzle vane having any such combination of modes may be applied not only to the nearest vane 23T but also to several nozzle vanes 23 at positions relatively close to the tongue portion 41. The auxiliary nozzle vane structure may be applied to three nozzle vanes 23 including the nearest vane 23T and the main vanes 23M on both sides of the nearest vane 23T.

Figure 7:
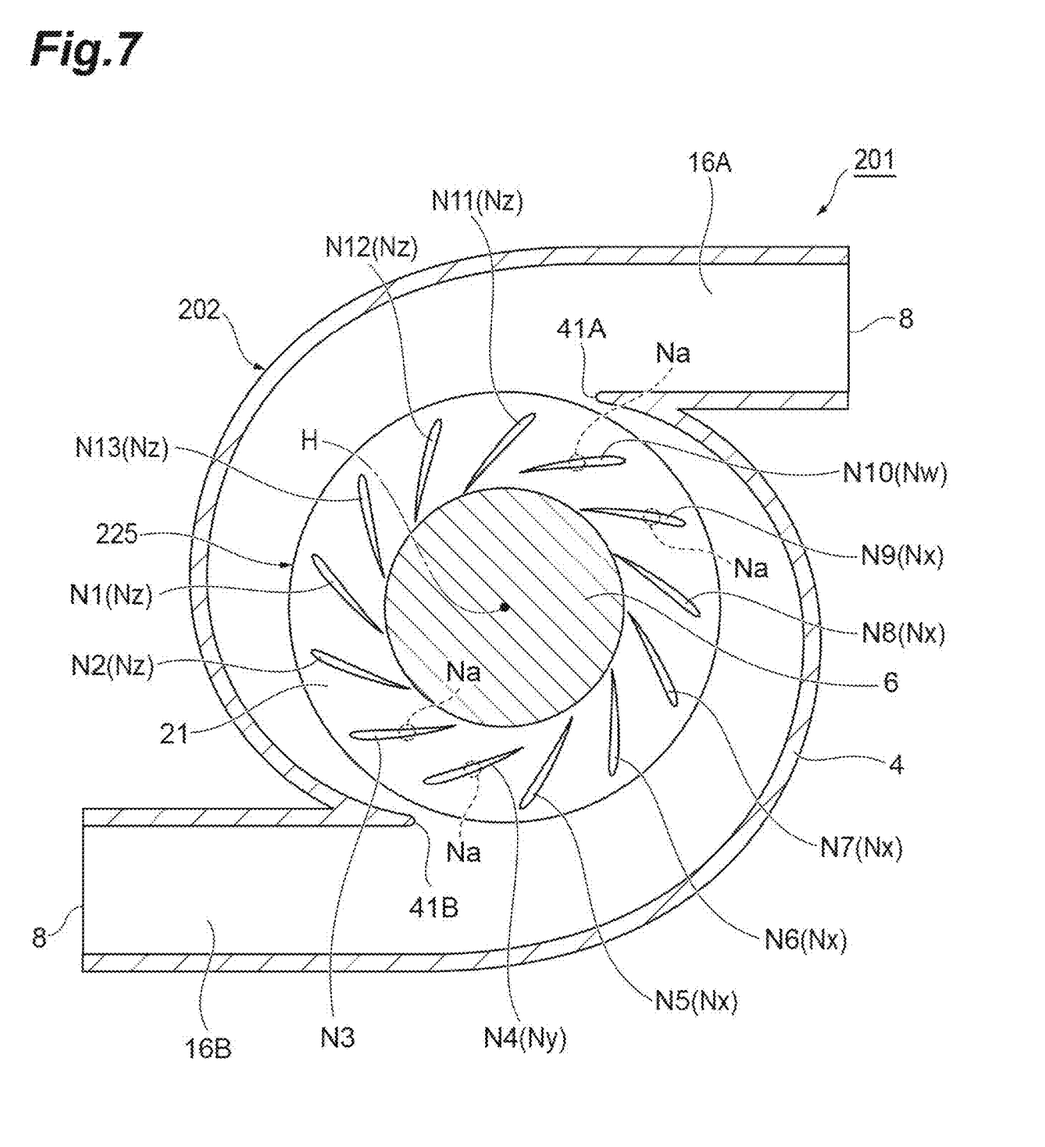
FIG. 7 is a cross-sectional view of an example turbine viewed axially.

FIG. 7 illustrates an example turbocharger 201 including a turbine 202. The turbine 202 is a multi-scroll turbine and includes two scroll flow passages 16A and 16B. The scroll flow passage 16A (e.g., first scroll flow passage) and the scroll flow passage 16B (e.g., second scroll flow passage) have the same shape, and are provided at rotationally symmetric positions centered on the rotation axis H. A gas inflow passage 21 surrounds the turbine wheel 6 and fluidly coupled to the scroll flow passage 16A and the scroll flow passage 16B. The scroll flow passage 16A is fluidly coupled to the second scroll flow passage 16B so as to surround the gas inflow passage 21.

The turbine 202 has two tongue portions of a tongue portion 41A (e.g., first tongue portion) and a tongue portion 41B (e.g., second tongue portion). A variable nozzle assembly 225 of the turbine 202 includes 13 nozzle vanes N1 to N13. Reference numerals N1 to N13 of the nozzle vanes (e.g., inflow passage nozzle vanes) are given in ascending order counterclockwise as illustrated in FIG. 7, and among the nozzle vanes, the nozzle vane N4 is the nozzle vane closest to the tongue portion 41B, and the nozzle vane N10 is the nozzle vane closest to the tongue portion 41A. The nozzle vane N10 is a first auxiliary nozzle vane (e.g., nozzle vane Nw) adjacent to the tongue portion 41A, and the nozzle vane N4 is a second nozzle vane (e.g., nozzle vane Ny) adjacent to the tongue portion 41B. The nozzle vane N5 to N9 are first main nozzle vanes (e.g., nozzle vanes Nx), and the nozzle vane N1 to N3 and N11 to N13 are second main nozzle vanes (e.g., nozzle vanes Nz).

Figure 8A:
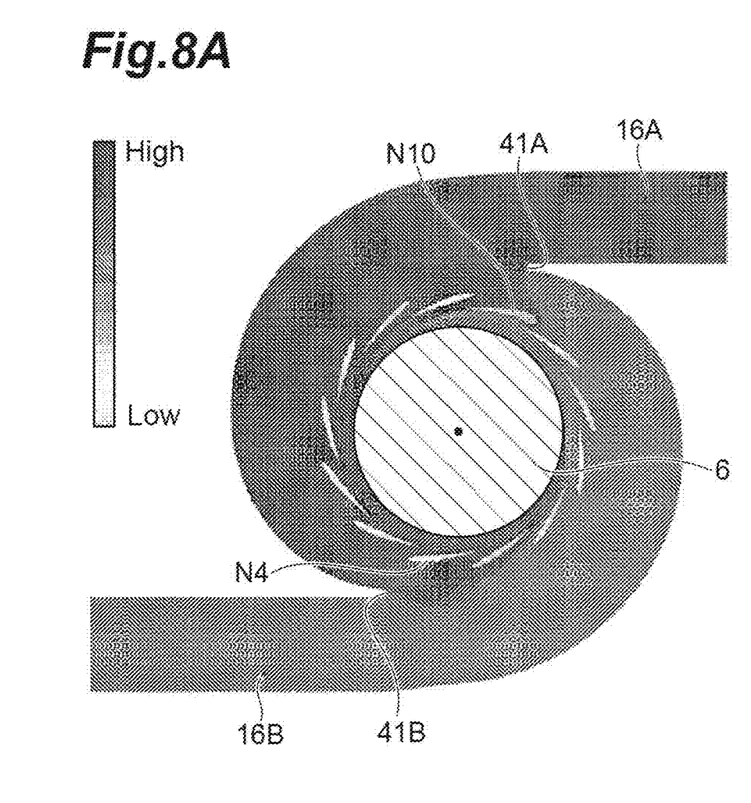
FIG. 8A is a contour diagram illustrating a pressure distribution in an example turbine.

A width of the first auxiliary nozzle vane Nw in an axial direction of the rotating shaft Na is smaller than a width of each of the first main nozzle vanes Nx in the axial direction of the rotating shaft Na. A width of the second auxiliary nozzle vane Ny in an axial direction of the rotating shaft Na is smaller than a width of each of the second main nozzle vanes Nz in the axial direction of the rotating shaft Na. In the turbine 202, there is a state in which exhaust gas flows in from only one (herein, the scroll flow passage 16A) of the two scroll flow passages 16A and 16B (hereinafter such a state is referred to as "single inlet inflow state"). FIG. 8 is a contour diagram illustrating a pressure distribution in the turbine 202 in the single inlet inflow state. FIG. 8A illustrates a state in which the nozzles are fully closed, and FIG. 8B illustrates a state in which the nozzles are fully open.

Figure 9A:
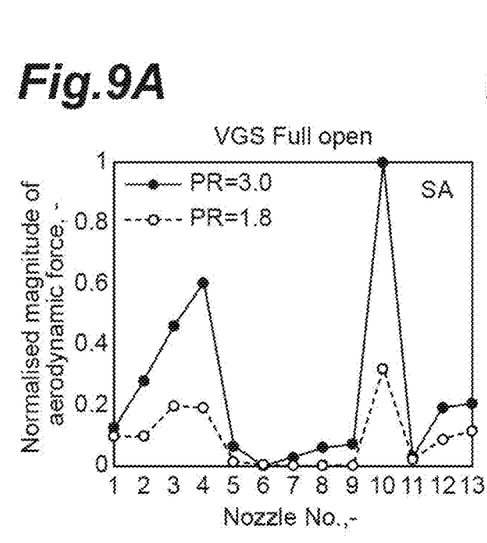
FIG. 9A is a graph illustrating fluid force acting on example vanes.
Figure 9B:
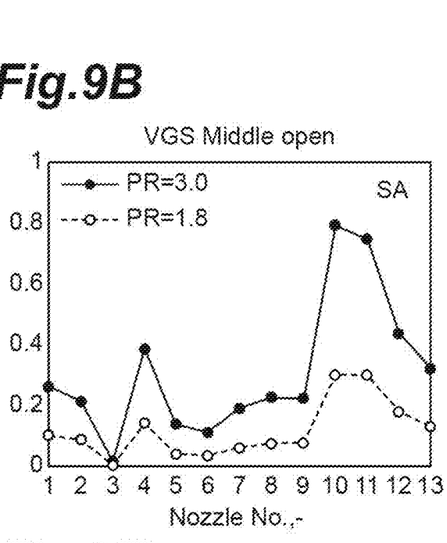
FIG. 9B is a graph illustrating fluid force acting on example vanes.
Figure 9C:
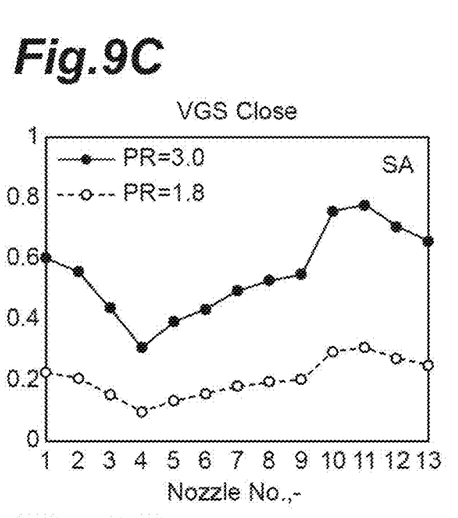
FIG. 9C is a graph illustrating fluid force acting on example vanes.
Figure 9D:
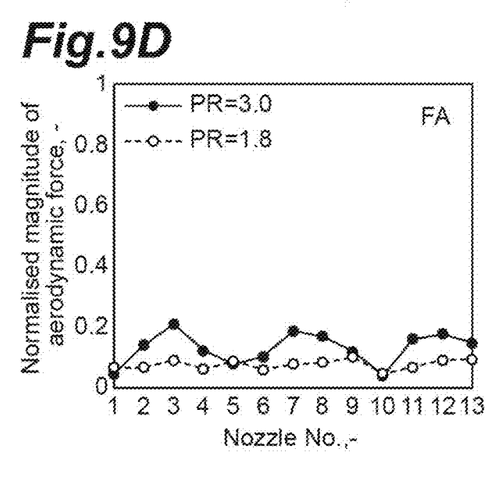
FIG. 9D is a graph illustrating fluid force acting on example vanes.
Figure 9E:
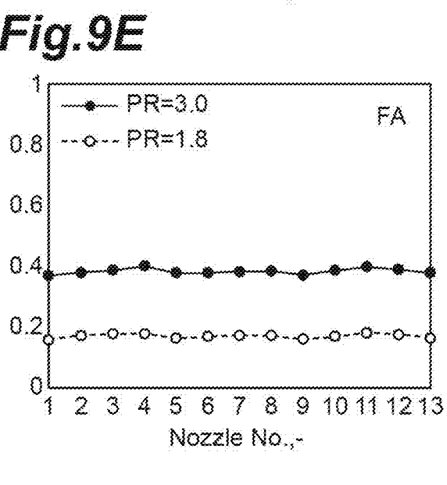
FIG. 9E is a graph illustrating fluid force acting on example vanes.
Figure 9F:
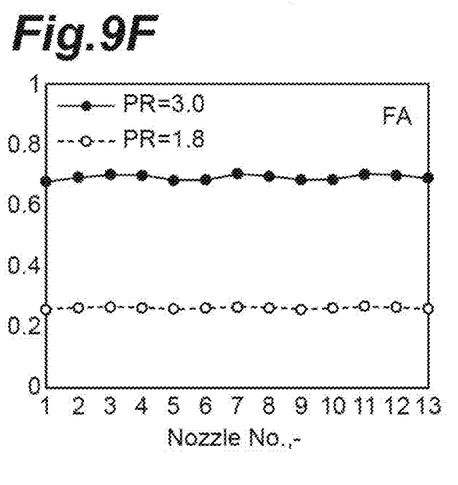
FIG. 9F is a graph illustrating fluid force acting on example vanes.

FIGS. 9A to 9F are graphs illustrating the fluid force acting on each of the nozzle vanes N1 to N13. FIGS. 9A to 9C correspond to the single inlet inflow state, where FIG. 9A corresponds to a condition that the nozzles are fully open, FIG. 9B corresponds to a condition that the nozzles are half-open, and FIG. 9C corresponds to a condition that the nozzles are fully closed. For comparison, FIGS. 9D to 9F correspond to a dual inlet inflow state (state in which exhaust gas flows in from both of the two scroll flow passages 16A and 16B), where FIG. 9D corresponds to a condition that the nozzles are fully open, FIG. 9E corresponds to a condition that the nozzles are half-open, and FIG. 9F corresponds to a condition that the nozzles are fully closed. In FIGS. 9A to 9F, the case of pressure ratio=3.0 is indicated by the solid line graph, and the case of pressure ratio=1.8 is indicated by the broken line graph. The pressure ratio is a ratio of the pressure at the outlet to the pressure at the inlet of the turbine 202. In FIGS. 9A to 9F, the vertical axis represents the normalized fluid force (normalized magnitude of aerodynamic force).

Figure 8B:
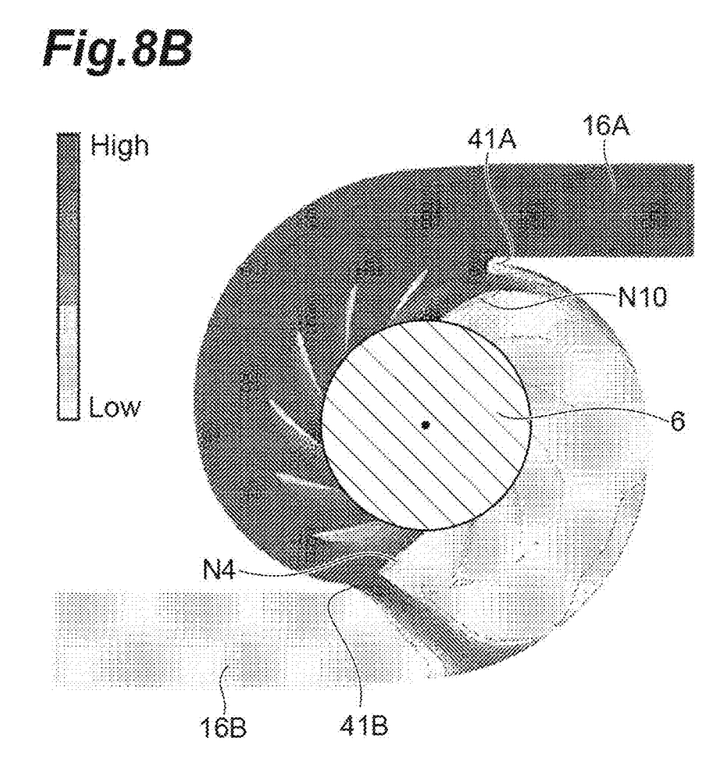
FIG. 8B is a contour diagram illustrating a pressure distribution in an example turbine.

Referring to FIGS. 8A and 8B, it can be seen that, in the single inlet inflow state, a pressure difference is generated in the circumferential direction in the vicinity of the tongue portions 41A and 41B. In particular, when the nozzles are fully open (FIG. 8B), the pressure difference is remarkable, and it can be seen that, in the nozzle vane N4 closest to the tongue portion 41B and the nozzle vane N10 closest to the tongue portion 41A, a large pressure difference is generated in the circumferential direction across the vanes. Accordingly, it is found that large fluid force acts on the nozzle vane N4 and the nozzle vane N10 due to the large pressure difference in the circumferential direction across the vanes. Further, also referring to FIGS. 9A to 9C, it can be seen that larger fluid force acts on the nozzle vane N4 and the nozzle vane N10 than the other nozzle vanes. Further, the comparison between FIGS. 9A to 9C and FIGS. 9D to 9F reveals that the deviation of the fluid force with respect to the nozzle vane N4 and the nozzle vane N10 is noticeable in the single inlet inflow state rather than the dual inlet inflow state.

The structure of the nozzle vane N4 and the nozzle vane N10 may be different from the structures of the other nozzle vanes N1 to N3, and N 5 to N9. The nozzle vanes N4 and N10 may include at least one of the foregoing modes 1 to 4. The nozzle vanes N4 and N10 may include all of the modes 1 to 4, or may include any one, two or three of the modes 1 to 4. The structure of the auxiliary nozzle vane having any such combination of modes may be applied not only to the nozzle vanes N4 and N10 but also to several nozzle vanes relatively close to the tongue portions 41A and 41B. The auxiliary nozzle vane structure may be applied to a total of four nozzle vanes N4 and N5 and nozzle vanes N10 and N11.

It is to be understood that not all aspects, advantages and modes described herein may necessarily be achieved by, or included in, any one particular example. Indeed, having described and illustrated various examples herein, it should be apparent that other examples may be modified in arrangement and detail.

Some additional examples are disclosed as follows, with continued reference to the drawings for convenience of description.

An example turbine (2) may include a turbine housing (4) having a scroll flow passage (16) and a gas inflow passage (21) fluidly coupled to the scroll flow passage (16) and a variable nozzle assembly (25) located inside the turbine housing (4). The variable nozzle assembly (25) may include a plurality of nozzle vanes (23) located in the gas inflow passage and a plurality of vane shafts (23a) separately fixed to the nozzle vanes (23). The plurality of nozzle vanes (23) may include a first nozzle vane (23T) and a number of second nozzle vanes (23M). A width of the first nozzle vane (23T) in an axial direction of the vane shafts (23a) mat be smaller than a width of each of the second nozzle vane (23M) in the axial direction of the vane shafts.

The scroll flow passage (16) may include a first end section (16a), a second end section (16b) and a connecting section (16c) fluidly coupling the first end section (16a) and the second end section (16b). The turbine housing (4) may include a tongue portion (41) located on the connecting section (16c). A distance from the first nozzle vane (23T) to the tongue portion (41) may be less than a distance from each of the second nozzle vanes (23M) to the tongue portion (41).

Among the plurality of nozzle vanes, the first nozzle vane (23T) may be located at a position closest to the tongue portion (41). A structure of the first nozzle vane (23T) is different from the second nozzle vanes (23M).

The plurality of vane shafts (23) may include a first vane shaft (23Ta) fixed to the first nozzle vane (23T) and a number of second vane shafts (23a) fixed to the second nozzle vanes (23M). A diameter of the first vane shaft (23Ta) may be greater than a diameter of each of the second vane shafts (23a).

The first nozzle vane (23T) may be configured to be non-rotatable at a fully closed position of a nozzle in the variable nozzle assembly (25).

The turbine (2) may include a turbine wheel (6) configured to discharge gas flowing from the gas inflow passage (21) in a discharge direction. The first nozzle vane (23T) may be configured to be displaced, in a parallel direction to the discharge direction, from a center position of the gas inflow passage (21).

The variable nozzle assembly (25) may include a nozzle ring (31) supporting the vane shafts (23a), and a plate (32) spaced apart from the nozzle ring (31) in the parallel direction to form the gas inflow passage (21) between the plate (32) and the nozzle ring (31). A distance between the first nozzle vane (23T) and the plate (32) may be smaller than a distance between the first nozzle vane (23T) and the nozzle ring (31).

As shown in FIG. 4, the distance (Gk) between the first nozzle vane (23T) and the nozzle ring (31) may be larger than a distance (Gx) between each of the second nozzle vanes (23M) and the nozzle ring (31).

The turbine (2) may include an urging mechanism (43) configured to urge the first nozzle vane (23T) toward the discharge direction.

The variable nozzle assembly (25) may include a nozzle ring (31) supporting the plurality of vane shafts (23a). The plurality of vane shafts (23a) may include a first vane shaft (23a) non-rotatably fixed to the nozzle ring (31) and a second vane shaft (23a) rotatably supported by the nozzle ring (31).

The variable nozzle assembly (25) may include a nozzle ring (31) supporting the plurality of vane shafts (23a). A distance between the first nozzle vane (23T) and the nozzle ring (31) is larger than a distance between each of the second nozzle vanes (23M) and the nozzle ring (31).

An example turbine (2, 202) may include a turbine housing (4) having a scroll flow passage (16) and a tongue portion (41, 41A) of the scroll flow passage (16), a turbine wheel (6) housed in the turbine housing (4), a gas inflow passage (21) fluidly coupled to the scroll flow passage (16, 16A), and surrounding the turbine wheel (6) and a plurality of inflow passage nozzle vanes (23, Nw, Nx) circumferentially located, in the gas inflow passage (21), around a rotary shaft (14) of the turbine wheel (6). The plurality of inflow passage nozzle vanes (23, Nw, Nx) may include an auxiliary nozzle vane (23T, Nw) adjacent to the tongue portion (41A) and a number of main nozzle vanes (23M, Nx). A width of the auxiliary nozzle vane (23T, Nw) in an axial direction of the rotary shaft (14) may be smaller than a width of each of the main nozzle vanes (23M, Nx) in the axial direction of the rotary shaft (14).

The turbine housing (4) may include a second scroll flow passage (16B) and a second tongue portion (41B) of the second scroll flow passage (16B). The scroll flow passage (16A) may be fluidly coupled to the second scroll flow passage (16B) so as to surround the gas inflow passage (21).

The turbine may include a plurality of second inflow passage nozzle vanes circumferentially located (Ny, Nz), in the gas inflow passage (21) around the turbine wheel (6). The plurality of second inflow passage nozzle vanes comprises a second auxiliary nozzle vane (Ny) adjacent to the second tongue portion (41B), and a number of second main nozzle vanes (Nz). A width of the second auxiliary nozzle vane (Ny) in the axial direction of the rotating shaft is smaller than a width of each of the second main nozzle vanes (Nz) in the axial direction of the rotating shaft.

An example turbine (2) may include a turbine housing (4) having a scroll flow passage (16) and a gas inflow passage (21) fluidly coupled to the scroll flow passage (16), a plurality of nozzle vanes (23) located in the gas inflow passage and a nozzle ring (31) supporting the plurality of nozzle vanes (23). The plurality of nozzle vanes (23) may include a first nozzle vane (23T) and a number of second nozzle vanes (23M. A distance between the first nozzle vane (23T) and the nozzle ring (31) may be larger than a distance between each of the second nozzle vanes (23M) and the nozzle ring (31).

The scroll flow passage (16) may include a first end section (16a), a second end section (16b) and a connecting section (16c) fluidly coupling the first end section (16a) and the second end section (16b). The turbine housing (4) may include a tongue portion (41) located on the connecting section (16c). A distance from the first nozzle vane (23T) to the tongue portion (41) may be less than a distance from each of the second nozzle vanes (23M) to the tongue portion.

The turbine may include a plate (32) configured to form the gas inflow passage (21) between the nozzle ring (31). A distance between the first nozzle vane (23T) and the plate (32) may be smaller than the distance between the first nozzle vane (23T) and the nozzle ring (31).

The distance between the first nozzle vane (23T) and the plate (32) may be larger than the distance between each of the second nozzle vanes (23M) and the nozzle ring (31).

The first nozzle vane (23T) may be non-rotatably fixed to the nozzle ring (31). The second nozzle vane (23M) may be rotatably supported by the nozzle ring (31).

What is claimed is:

1. A turbine comprising:
   a turbine housing having a scroll flow passage and a gas inflow passage fluidly coupled to the scroll flow passage; and
   a variable nozzle assembly located inside the turbine housing, wherein the variable nozzle assembly comprises:
      a plurality of nozzle vanes located in the gas inflow passage and a plurality of vane shafts separately fixed to the nozzle vanes;
      a nozzle ring supporting the plurality of vane shafts; and
      a plate spaced apart from the nozzle ring to form the gas inflow passage between the plate and the nozzle ring,
   wherein the plurality of nozzle vanes comprises a first nozzle vane and a number of second nozzle vanes,
   wherein a width of the first nozzle vane in an axial direction of the vane shafts is smaller than a width of each of the second nozzle vane in the axial direction of the vane shafts, and
   wherein a distance between the first nozzle vane and the plate is smaller than a distance between the first nozzle vane and the nozzle ring.

2. The turbine according to claim 1,
   wherein the scroll flow passage comprises a first end section, a second end section and a connecting section fluidly coupling the first end section and the second end section,
   wherein the turbine housing comprises a tongue portion located on the connecting section, and
   wherein a distance from the first nozzle vane to the tongue portion is less than a distance from each of the second nozzle vanes to the tongue portion.

3. The turbine according to claim 2,
   wherein among the plurality of nozzle vanes, the first nozzle vane is located at a position closest to the tongue portion, and
   wherein a structure of the first nozzle vane is different from the second nozzle vanes.

4. The turbine according to claim 1,
   wherein the plurality of vane shafts comprises a first vane shaft fixed to the first nozzle vane and each of a number of second vane shafts fixed to a corresponding one of the second nozzle vanes, and
   wherein a diameter of the first vane shaft is greater than a diameter of each of the second vane shafts.

5. The turbine according to claim 1, wherein the first nozzle vane is non-rotatably fixed to the nozzle ring at a fully closed position of a nozzle in the variable nozzle assembly.

6. The turbine according to claim 1, wherein the distance between the first nozzle vane and the nozzle ring is larger than a distance between each of the second nozzle vanes and the nozzle ring.

7. The turbine according to claim 1, further comprising:
   a turbine wheel configured to discharge gas flowing from the gas inflow passage in a discharge direction; and
   a spring configured to urge the first nozzle vane toward the discharge direction.

8. The turbine according to claim 1,
   wherein the first nozzle vane is non-rotatably fixed to the nozzle ring, and
   wherein the second nozzle vane is rotatably supported by the nozzle ring.

9. A turbine comprising:
   a turbine housing having a scroll flow passage and a gas inflow passage fluidly coupled to the scroll flow passage; and
   a variable nozzle assembly located inside the turbine housing,
   wherein the variable nozzle assembly comprises:
      a plurality of nozzle vanes located in the gas inflow passage;
      a plurality of vane shafts separately fixed to the nozzle vanes; and
      a nozzle ring supporting the plurality of vane shafts,
   wherein the plurality of nozzle vanes comprises a first nozzle vane and a number of second nozzle vanes,
   wherein a width of the first nozzle vane in an axial direction of the vane shafts is smaller than a width of each of the second nozzle vane in the axial direction of the vane shafts, and
   wherein a distance between the first nozzle vane and the nozzle ring is larger than a distance between each of the second nozzle vanes and the nozzle ring.

10. A turbocharger comprising the turbine according to claim 1.

11. A turbine comprising:
    a turbine housing having a first scroll flow passage and a first tongue portion of the first scroll flow passage, and a second scroll flow passage and a second tongue portion of the second scroll flow passage;

a turbine wheel housed in the turbine housing;

a gas inflow passage fluidly coupled to the scroll flow passage, and surrounding the turbine wheel, wherein the first scroll flow passage is fluidly coupled to the second scroll flow passage so as to surround the gas inflow passage; and a plurality of inflow passage nozzle vanes circumferentially located, in the gas inflow passage, around a rotary shaft of the turbine wheel, wherein the plurality of inflow passage nozzle vanes comprises an auxiliary nozzle vane adjacent to the first tongue portion and a number of main nozzle vanes, and wherein a width of the auxiliary nozzle vane in an axial direction of the rotary shaft is smaller than a width of each of the main nozzle vanes in the axial direction of the rotary shaft.

12. The turbine according to claim 11, further comprising a plurality of second inflow passage nozzle vanes circumferentially located, in the gas inflow passage around the turbine wheel, wherein the plurality of second inflow passage nozzle vanes comprises a second auxiliary nozzle vane adjacent to the second tongue portion, and a number of second main nozzle vanes, and wherein a width of the second auxiliary nozzle vane in the axial direction of the rotary shaft is smaller than a width of each of the second main nozzle vanes in the axial direction of the rotary shaft.

13. A turbine comprising:

a turbine housing having a scroll flow passage and a gas inflow passage fluidly coupled to the scroll flow passage;

a plurality of nozzle vanes located in the gas inflow passage;

a nozzle ring supporting the plurality of nozzle vanes; and a plate configured to form the gas inflow passage between the plate and the nozzle ring, wherein the plurality of nozzle vanes comprises a first nozzle vane and a number of second nozzle vanes, wherein a distance between the first nozzle vane and the plate is smaller than a distance between the first nozzle vane and the nozzle ring, and wherein a distance between the first nozzle vane and the nozzle ring is larger than a distance between each of the second nozzle vanes and the nozzle ring.

14. The turbine according to claim 13, wherein the scroll flow passage comprises a first end section, a second end section and a connecting section fluidly coupling the first end section and the second end section, wherein the turbine housing comprises a tongue portion located on the connecting section, and wherein a distance from the first nozzle vane to the tongue portion is less than a distance from each of the second nozzle vanes to the tongue portion.

15. The turbine according to claim 13, wherein the distance between the first nozzle vane and the plate is larger than the distance between each of the second nozzle vanes and the nozzle ring.

16. The turbine according to claim 13, wherein the first nozzle vane is non-rotatably fixed to the nozzle ring, and wherein the second nozzle vanes are rotatably supported by the nozzle ring.

17. The turbine according to claim 13, wherein the plurality of vane shafts comprises a first vane shaft fixed to the first nozzle vane and each of a number of second vane shafts fixed to a corresponding one of the second nozzle vanes, and wherein a diameter of the first vane shaft is greater than a diameter of each of the second vane shafts.

18. The turbine according to claim 9, wherein the plurality of vane shafts comprises a first vane shaft fixed to the first nozzle vane and each of a number of second vane shafts fixed to a corresponding one of the second nozzle vanes, and wherein a diameter of the first vane shaft is greater than a diameter of each of the second vane shafts.

19. The turbine according to claim 9, wherein the scroll flow passage comprises a first end section, a second end section and a connecting section fluidly coupling the first end section and the second end section, wherein the turbine housing comprises a tongue portion located on the connecting section, wherein among the plurality of nozzle vanes, the first nozzle vane is located at a position closest to the tongue portion, and wherein a structure of the first nozzle vane is different from the second nozzle vanes.

20. The turbine according to claim 9, further comprising a turbine wheel configured to discharge gas flowing from the gas inflow passage in a discharge direction, wherein a width of the first nozzle vane in the discharge direction is smaller than a width of each of the second nozzle vane in the discharge direction.

* * * * *